Aug. 14, 1934.  P. A. FRIEDELL  1,970,004

INTERNAL COMBUSTION ENGINE

Filed Dec. 26, 1931   7 Sheets-Sheet 1

INVENTOR.
Philip A. Friedell

Aug. 14, 1934.    P. A. FRIEDELL    1,970,004
INTERNAL COMBUSTION ENGINE
Filed Dec. 26, 1931    7 Sheets-Sheet 2

INVENTOR.
Philip A. Friedell

INVENTOR.
Philip A. Friedell

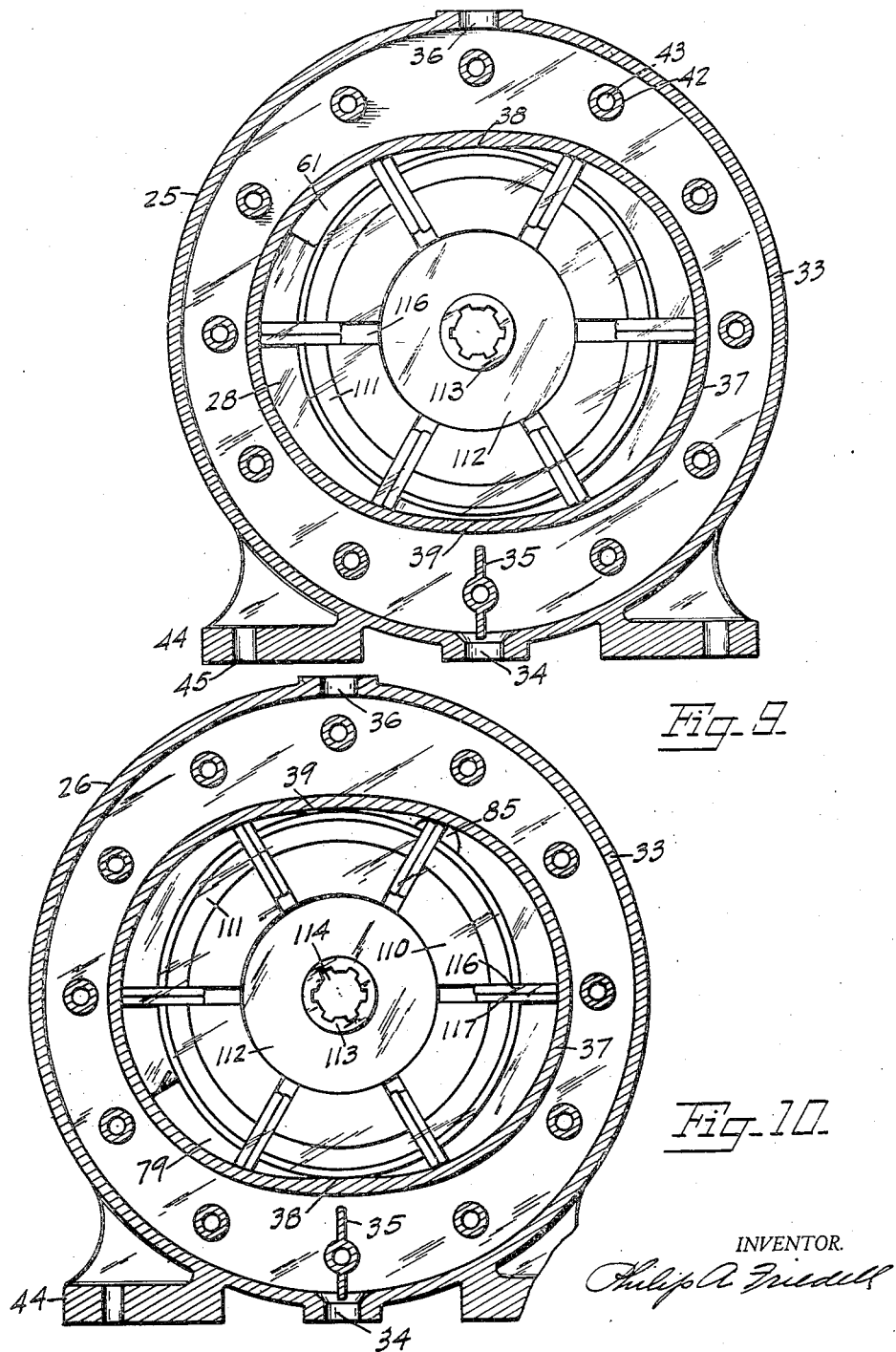

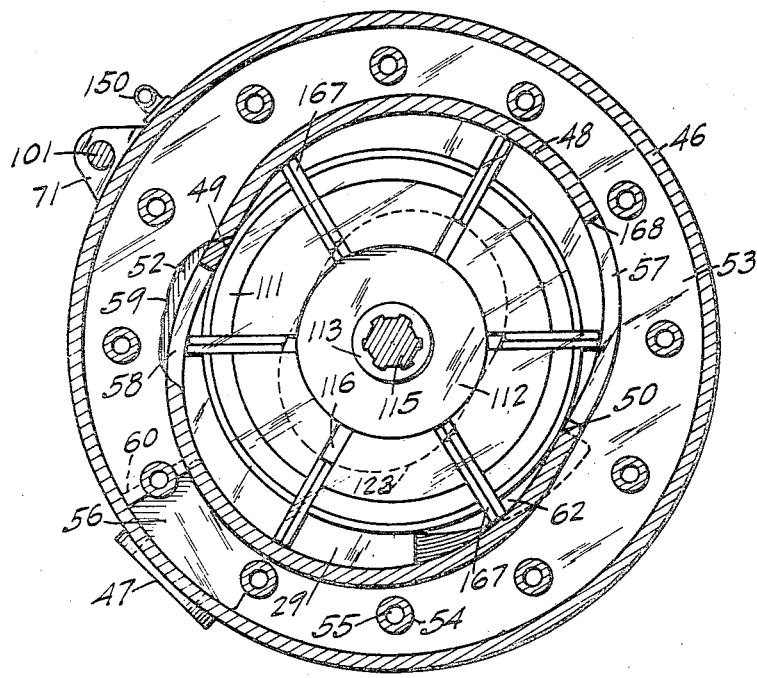
Fig. 11
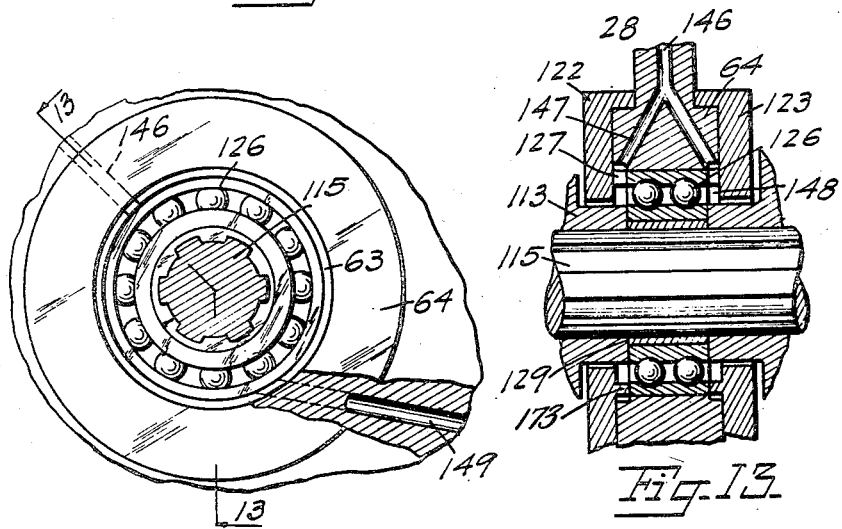
Fig. 12.
Fig. 13.
INVENTOR.
Philip A. Friedell

INVENTOR.
Philip A. Friedell

Aug. 14, 1934.   P. A. FRIEDELL   1,970,004
INTERNAL COMBUSTION ENGINE
Filed Dec. 26, 1931   7 Sheets-Sheet 7
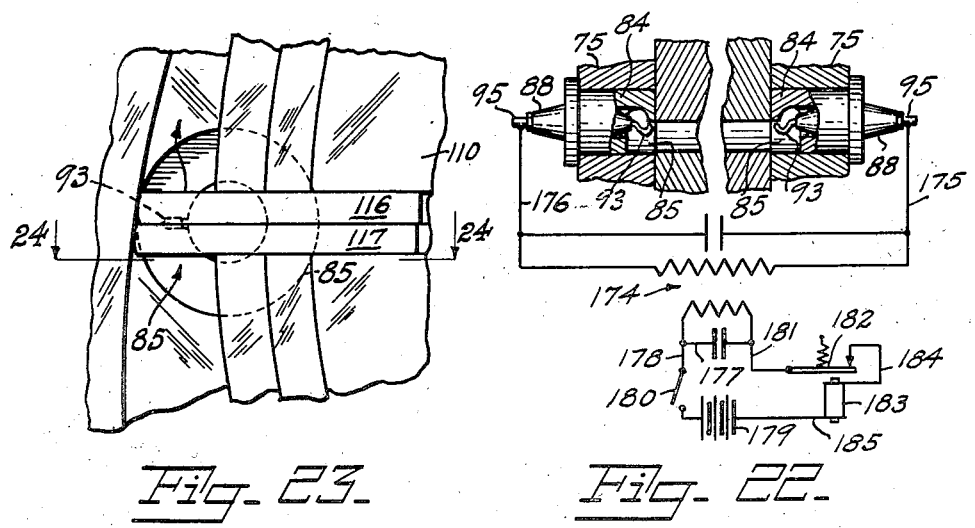
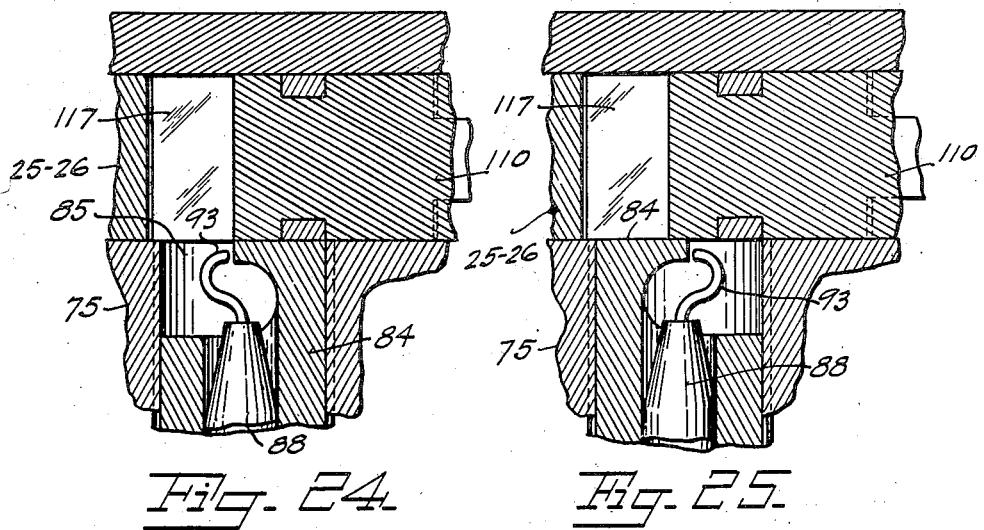
INVENTOR.
Philip A. Friedell Patented Aug. 14, 1934

1,970,004

UNITED STATES PATENT OFFICE

1,970,004

INTERNAL COMBUSTION ENGINE

Philip A. Friedell, Oakland, Calif.

Application December 26, 1931, Serial No. 583,254

20 Claims. (Cl. 123—16)

This invention is an internal combustion engine especially directed to the rotary type, although some of the features incorporated are applicable to and are intended to cover similar applications in reciprocating engines.

The objects of the invention are as follows:

First; To provide an internal combustion engine which is readily balanced and which will deliver smooth and uniform power without vibration, shock or detectable impulse.

Second; To provide an internal combustion engine which will attain the maximum efficiency, first, by delivering combustible gas to a combustion chamber uncontaminated by previously burnt gases; second, by providing a long period for intake of the gas; third, by igniting the combustible mixture by propagation or communication with a burning charge; fourth, by exhausting the burnt charge into a second expansion chamber to provide additional power from the charge; fifth, by heating the second expansion chamber by the gases exhausted therefrom for maintaining the pressure as nearly uniform as possible during the second expansion; sixth, to connect the first expansion chamber with the second expansion chamber by means of the shortest possible passages free from restricting elements; seventh, by providing maximum port areas and omitting all valves and valve mechanisms in the engine, and eighth, by obtaining the maximum arcuate length of combustion period and power delivery period.

Third; To provide an internal combustion engine which is free from valves and valve mechanisms and the consequent troubles incurred thereby.

Fourth; To provide an internal combustion engine which may be operated at high speeds and which due to its high efficiency and method of operation will deliver unusual power unattainable by other means.

Fifth; To provide an internal combustion engine with ignition by propagation, high tension electrical ignition being used for starting only, the electrical ignition not requiring timing and being preferably supplied by an interrupter or buzzer having a comparatively low frequency of approximately three hundred cycles per second.

Sixth; To provide propagation ignition whereby a combustible charge just past its point of maximum compression is ignited by propagation from a previously ignited expanding charge.

Seventh; To provide the propagation ignition with means whereby the ignition may be interrupted so as to permit the motor to be charged with fuel whereby the motor may be started automatically by auxiliary electrical or other ignition means.

Eighth; To provide a dependable, efficient double expansion or compound internal combustion engine adapted to maintain maximum pressure related to temperature of the gases for the second stage expansion.

Ninth; To provide a rotary internal combustion engine with self packing vanes and rotor, and to provide positive means for actuating the vanes.

Tenth; To provide a compound internal combustion engine complete in a single unit, requiring only a carburetor and a supply of oil and combustible fluid for its operation and in which the impellor of the oil pump is formed by and in the end of the shaft, and the ignition after starting is by propagation.

Eleventh; To provide an internal combustion motor which is simply and economically constructed, easily repaired and replaced, which requires no timing or ignition distribution and no valves or valve system, and which is built up of a minimum number of parts which are easily machined and installed.

Other objects and advantages of the invention will become apparent as the following description is read on the drawings forming a part of this specification and in which similar reference characters are used to designate similar parts throughout the several views, and in which;

Fig. 9 is a section taken on line 9—9 of Fig. 3.

Fig. 10 is a section taken on line 10—10 of Fig. 3 showing the leading vane in the position assumed just after opening the ignition bypass into communication with the compression chamber.

Fig. 11 is a section taken on line 11—11 of Fig. 3.

Fig. 12 is a fragmentary view of one of the dividing walls or partitions showing the ball bearing mounting and system of oiling.

Fig. 13 is a section taken on line 13—13 of Fig. 12.

Figure 15:
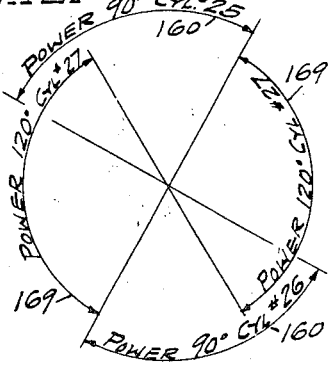

Fig. 15 diagrammatically illustrates the duration of, and overlapping of power in the three cylinders for one vane in each high compression or combustion cylinder.

Figs. 16 to 21 are diagrammatic views showing the various cycles of operation for one vane in the combustion cylinders.

Fig. 22 is a wiring diagram showing the auxiliary or starting ignition means for the motor.

Fig. 23 is a fragmentary view showing the relation of rotor, vane and propagation ignition bypass, showing the bypass open.

Fig. 24 is a section taken on line 24—24 of Fig. 23.

Fig. 25 is a section similar to Fig. 24 except with the firing plug in its non-firing position.

The invention consists of either a single stage motor or a double expansion type, the single stage type having no second expansion cylinder, but may consist of any number of combustion cylinders.

Figure 1:
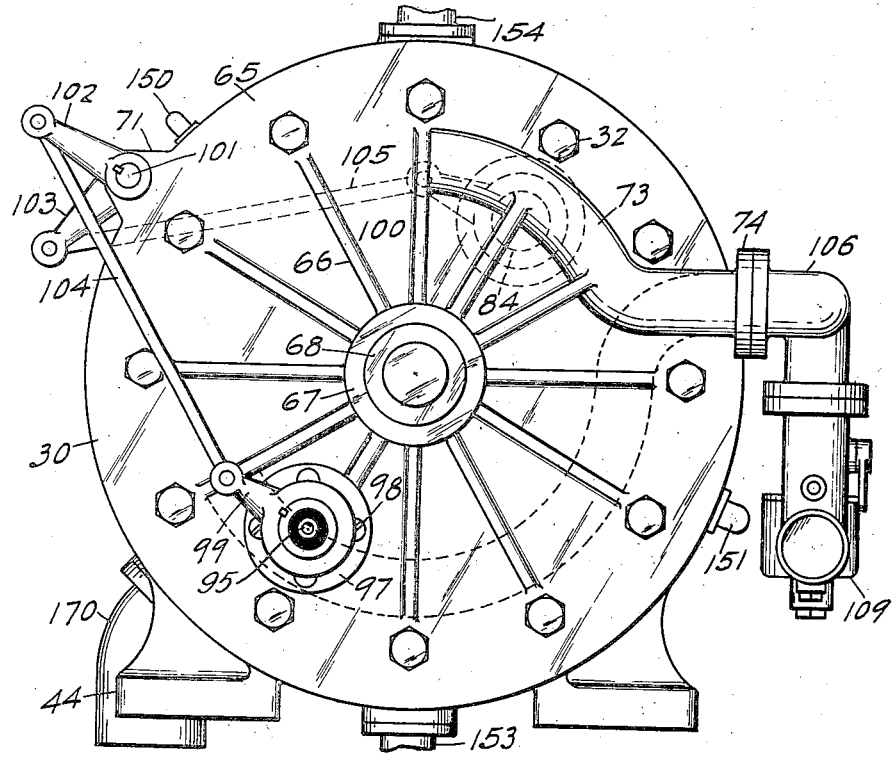
Fig. 1 is a front elevation of the invention complete with carburetor.
Figure 3:
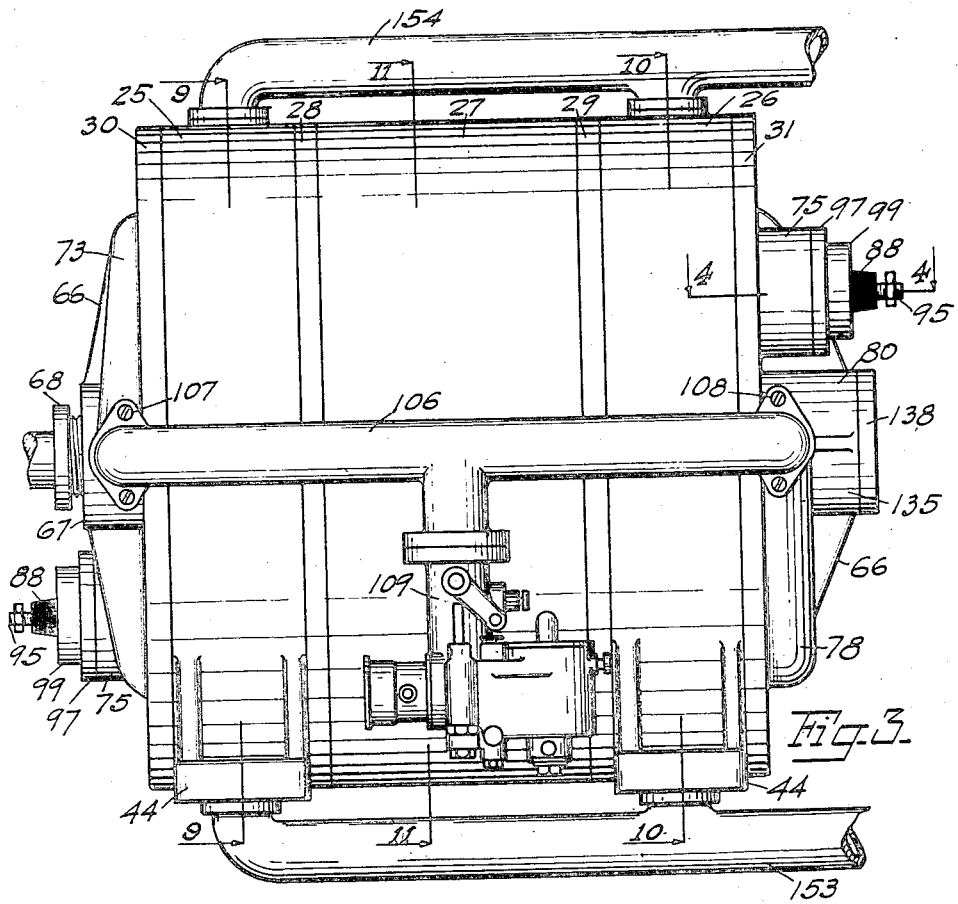
Fig. 3 is a side elevation of the invention showing the intake manifold and carburetor side.
Figures 4, 5:
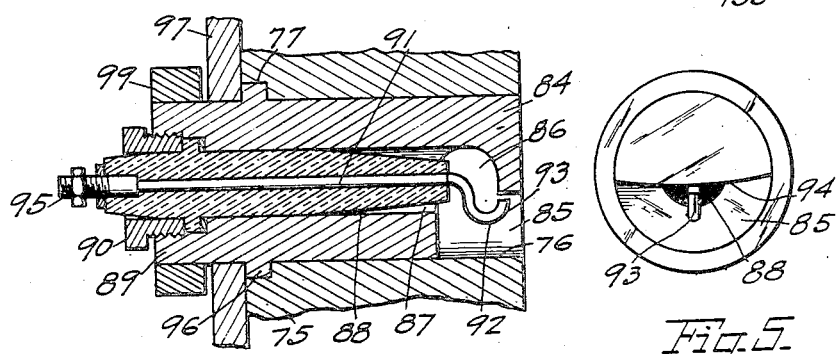
Fig. 4 is a section taken on line 4—4 of Fig. 3 and shows the interior construction of the ignition plug with starting plug mounted therein.
Fig. 5 is an end view of Fig. 4.
Figure 6:
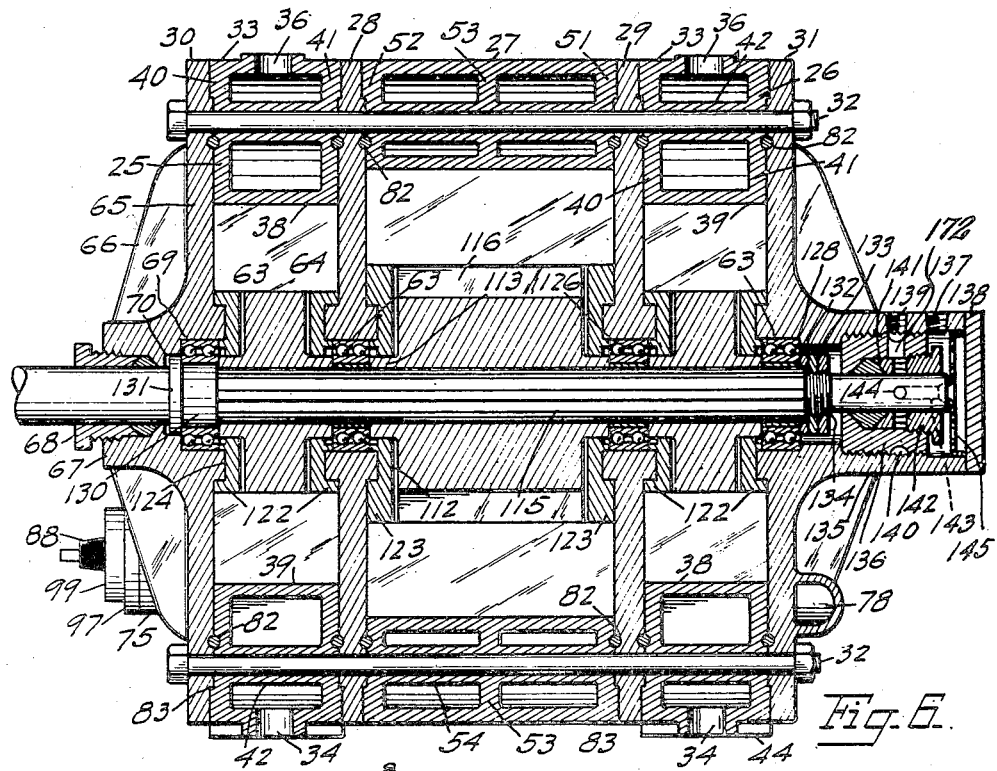
Fig. 6 is a longitudinal sectional elevation through the invention.
Figure 7:
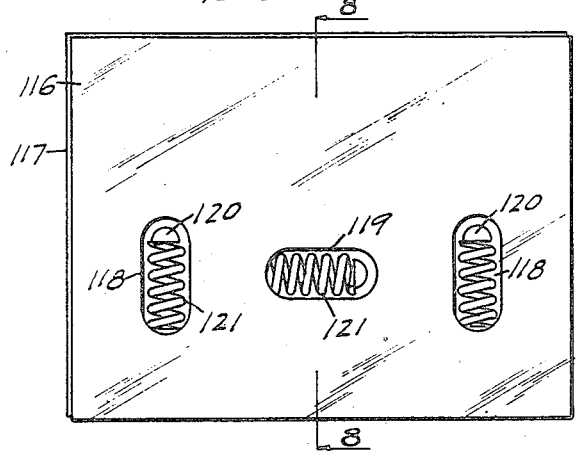
Fig. 7 is a plan view of the self-packing vane.
Figure 8:
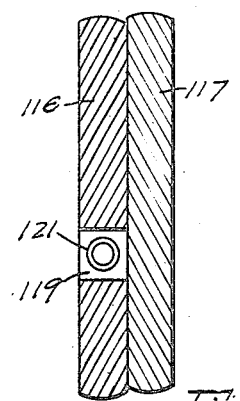
Fig. 8 is a section taken on line 8—8 of Fig. 7.

Figs. 1 and 3 illustrate a three cylinder, compound engine, the intermediate cylinder being a second expansion cylinder, and consists of two combustion cylinders 25 and 26 and a second expansion cylinder 27, dividing walls or partitions 28 and 29, a front head 30 and a rear head 31, all secured together by means of bolts 32.

The combustion cylinders 25 and 26 are similarly constructed except the rotor compartment is oppositely disposed, and consist of an outer wall 33 having a water inlet 34 at the bottom and a centrally disposed baffle 35 adapted to direct the flow of cooling water in both directions about the rotor compartment wall. A water outlet 36 is formed through the top of the outer wall 33.

The compartment wall 37 is substantially elliptical in form and has a compartment formed therein by two eccentric bores with a tangential connecting portion on one side forming a cooperating restriction 38 which cooperates with the periphery of the rotor, the other side being connected by an arcuate portion 39 which slightly clears the periphery of the rotor, forming a clearing restriction permitting the passage of gases between the rotor and the restriction, the purpose of which is to form a high compression zone and ignition chamber, the restriction being fully cooperative with the vanes. This feature is vital in the proper and efficient functioning of the engine and obviating the necessity for any valves.

The restriction 38 is adapted to positively seal the exhaust chamber from the intake chamber preventing any possibility of contamination of the combustible charge with the exhaust gases, and also obviates the necessity for either intake or exhaust valves.

Front walls 40 and rear walls 41 form a closed water compartment provided with an inlet and an outlet for the water. Hubs 42 extending between the front and rear walls provide a water seal for the bolts 32 which pass through the apertures 43 formed therethrough. Feet or bases 44 are provided for mounting the engine, and suitable bolt holes 45 are formed through the feet for anchor bolts. The feet may be replaced by suitable brackets for automotive installations.

The second expansion cylinder 27 is located between the combustion cylinders 25 and 26 and consists of an outer wall 46 having an exhaust outlet 47. The compartment wall 48 has a compartment formed therein consisting of two eccentric bores both sides of which are tangentially connected forming restrictions 49 and 50 which cooperate with the periphery of the rotor, the depth or length of the compartment being not less than twice that of the combustion cylinders.

Side walls 51 and 52 seal the sides of the housing between the compartment wall 48 and outer wall 46.

A dividing wall 53 is centrally disposed between the side walls forming two exhaust channels for the exhaust gases. Hubs 54 are provided with bolt apertures 55 for reception of the bolts 32. An opening 56 is provided in the central wall 53 adjacent the exhaust outlet 47, and centrally disposed slots 57 and 58 formed in the compartment wall 48 form exhaust ports and are centrally disposed on opposite sides of the central wall 53, a portion of the central wall being broken away to indicate this feature clearly at 59. A partition is formed at the edge of opening 56 as indicated at 60, between the side wall 52 and central wall 53, to direct the exhaust gases from port 58 about and over the rotor compartment for heating this compartment.

Partitions 28 and 29 are similarly formed but oppositely disposed with reference to the combustion chamber exhaust ports or bypasses, the exhaust port 61 in plate 28 being located at the top and to the left of the restriction as shown, while the exhaust port or bypass 62 in plate 29 is lo ' at the bottom and to the right of the restriction. Suitable apertures are provided for the bolts 32. A bore 63 is provided for the reception of ball bearings, and a concentric ring 64 provides a seat for the vane actuating cams.

The front head 30 consists of a plate 65 provided with reinforcing ribs 66 and with a hub 67 in which suitable packing means is provided for the shaft. Stepped counterbores 69 and 70 are provided for the reception of a ball bearing and a collar on the shaft. A concentric ring 64 is formed similarly to those on the partitions. Suitable apertures are provided for the bolts 32.

An ear 71 is formed on each plate 65 and 31 for reception of the ignition control shaft 101.

An intake port 72 communicates with the interior of the intake manifold extension 73 which is provided with a flange 74 for connection to the intake manifold or a carburetor.

A hub 75 is provided with a bore 76 and a counterbore 77 for reception of the ignition stud 84, the bore communicating with the chamber formed between the rotor and compartment wall.

The rear head 31 is formed similarly to the front head 30 throughout with the exception that the intake manifold extension 78 is located about the lower portion of the plate and the intake port 79 is oppositely disposed to the intake port 72, and the hub 80 is formed differently to accommodate and form the oil pump, the description of the hub being set forth in the description of the oil pump.

Grooves 81 are provided in the cooperating faces of the cylinders, partitions and heads to receive packing 82, and concentric alignment means 83 is provided for aligning the various elements.

The ignition means consists of a plug or ignition stud 84 rotatably mounted in the bore 76 in hub 75, the inner end being flush with the inside surface of the heads 30 and 31. The inner end of the plug is cut away at one side and undercut as shown at 85 and 86 and has a central bore 87 in which an insulating core 88 is secured by means of an annular collar 89 and nut 90, an electrode 91 extending therethrough and terminating at the inner end in an arcuately formed extension, the point 93 of which is adjusted to form a spark gap to the edge 94 of the plug, and terminating at the other end in a terminal 95 for connection of a high tension circuit. The plug is provided with an annular collar 96 fitting in the counterbore 77, the plug being secured against internal pressure by a cover plate 97 which is secured by screws 98. Levers 99 and 100 are secured on the plugs, the plugs for both cylinders being coincidently operated by means of the ignition control shaft 101 which is rotatably mounted in ears 71. Levers 102 and 103 are respectively connected with levers 99 and 100 by means of connecting rods 104 and 105 and the ignition studs 84 may be manually controlled by either of these levers.

An intake manifold 106 is connected to the flanges 74 on manifold extensions 73 and 78 as shown at 107 and 108 and is in communication with a carburetor 109.

It will be noted that the intake and exhaust ports conform to the space between the rotor and the eccentric bore walls, and extend from the cooperating restriction to a point from the center of the restriction equal to the angular distance between two vanes, plus slightly more than one-half the thickness of the vane, as is clearly disclosed in Figs. 16 to 21, providing thereby the maximum possible port area.

The rotors are identical in form except that the second expansion or intermediate rotor is at least twice the width of the combustion rotors or high compression rotors and consist each of a cylindrical member 110, the peripheries of which cooperate with restrictions 38, 49 and 50 and clear the restrictions 39, and transversely cooperate with the heads and partitions.

Packing ring sectors 111 are set in grooves formed in the rotor hub and are spring-urged against the walls of the cylinder, providing packing means for the rotor between the vanes.

The rotors are trepanned as shown at 112 to clear the vane actuating cams and coincidently forming hubs 113.

An axial bore 114 is key slotted to receive the splined shaft 115, and radial slots slidably receive the vanes, each of which preferably consist of two blades 116 and 117 in one of which spring-receiving recesses 118 and 119 are formed. Pins 120 are secured in the cooperating blade and springs 121 cooperate between the pins 120 and the end of the recess, thereby urging the blades in opposition to seal the chambers and prevent rattling or vibration when actuated by the cams.

The cams 122 in the combustion cylinders and 123 in the second expansion cylinder are similarly formed except that one side of cams 122 is arcuately formed to cause the vanes to cooperate with the clearing restrictions 39, and are provided with a groove 124 to seat over the annular rings 63 on the heads and partitions to which they are secured by means of screws 125, which also prevent any rotational movement thereof.

The ball bearings 126 in the partitions have the outer races secured between annular shoulders 173 formed by the grooves 124, being clamped between two cams 122 and 123. The outer races of the ball bearings in the heads are seated against the bottom of counterbores 69 and 128, respectively, and are secured by the cams 122 as shown.

The inner races are mounted on sleeves 129, except the front end bearing, which is mounted on the enlargement 130 on shaft 115, and are respectively secured between the collar 131 on shaft 115 and hubs 113, the entire unit being secured by means of a splined washer 132 and lock nuts 133 which cooperate with the threaded portion 134 of the shaft 115.

The oil pump is formed in the rear hub 135 and consists of an internally threaded hub in which a plug 136 is threadedly secured. An inlet port 137 communicates with the interior of the hub between the outer end of the plug 136 and cap 138, which is bolted to the end of the hub. A discharge port 139 communicates with an annular groove 140 in the plug.

Packing means consists of two members 141 and 142 one of the members having spaced thrust elements for spacing the two members and forming thereby a passage for fluid therebetween, and an aperture 172 communicates between the groove 140 and the space between members 141 and 142.

The impeller is formed in the shaft end by providing an axial bore 143 communicating with a plurality of radial apertures 144, which register with the space between the members 141 and 142. A plate 145 has a central funnel shaped opening extending into the bore 143 to direct the flow of oil into the intake 143, and a plurality of holes in the body of the plate permit flow of oil from one side of the plate to the other.

The oiling system consists of holes 146 formed in the heads and partitions, and being divided adjacent the bearing as shown at 147, opening into the recess 148 formed by the cam, the outlet for the oil being through a similar forked hole 149. Pipes 150 convey oil from the pump outlet 139 to the bearings, the oil being thence drained away to the supply tank through pipes 151.

The engine is readily assembled by first assembling the shaft with bearing in the front head, next placing the first rotor for cylinder 25 on the shaft, followed by cylinder 25, partition 28, following on through to the end plate 138. The nuts 133 are tightened through the bore in the rear hub before assembling the pump.

The oil pump is of the centrifugal type, the impeller being formed by the end portion of the shaft 115. A supply of oil is drawn through intake 137 through suitable piping and flows through the passages in plate 145 and thence is drawn through the central funnel shaped opening in the plate into the intake 143, the funnel preventing centrifugal action at the end of the shaft from forcing the oil away from the intake. The oil is projected radially through the apertures 144 into the space between members 142 and 143 and thence forced through the outlet 139 connected by suitable piping with pipe 150.

The oil flows down through the apertures 146 and 147 into the chambers 148 through openings 127 in the shoulders 173. Centrifugal action at the periphery of hubs 113 and of the inner races of the ball bearings causes most of the oil to drain out through apertures 149 and pipe 151, cooling the bearings, although sufficient oil is directed outwardly between the bore in the cam and the hub to keep the vanes, cams and cylinder walls lubricated, the oil pressure increasing with increase of speed of motor, thereby being automatic in supplying the necessary oil at all speeds. Ducts are preferably formed through the walls as shown at 152 to oil the ring packing 111.

The operation of the motor is as follows:

A supply of gasoline is connected with the carburetor 109 and a circulatory water supply is connected with the intake and outlet water manifolds 153 and 154. A supply of lubricating oil is connected to the oil intake 137.

Plug terminals 95 are connected to a suitable source of high tension current controlled by a switch, and may consist of a step-up transformer 174, the terminals 175 and 176 of the high tension side being connected to the two spark plugs 95, as both cylinders fire simultaneously. The low tension side of the transformer is shunted by a condenser 177 and has one terminal 178 connected to a battery 179 through a switch 180, the other terminal 181 being connected to the armature 182 of a buzzer or interrupter 183, the contact on the buzzer being connected to one terminal 184 of the magnet coil 183, the other terminal 185 of the magnet coil being connected to the other terminal of the battery 179.

Figure 18:
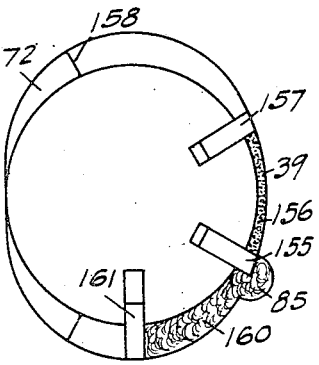

By turning shaft 115 sufficiently to draw in and compress a charge of gas, closing of the ignition switch 180 will cause ignition of the charge either in chamber 156 or 160, Fig. 18, depending on the location of vane 155, starting the motor, after which the electric ignition may be discontinued by opening switch 180 the motor continuing to operate by propagation ignition through the bypass 85 controlled by the vanes.

Figure 14:
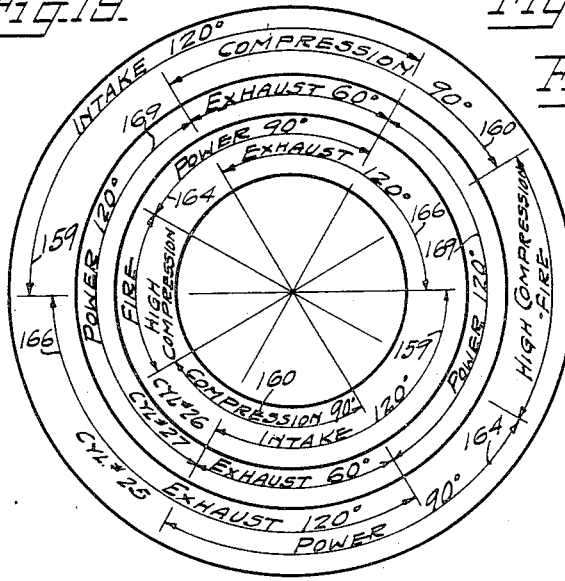
Fig. 14 is a diagram illustrating the duration of the various operation periods of each vane in each cylinder.

Referring to Figs. 16 to 21 for diagrammatic representation of the various conditions of gas action and control and ignition, and to Figs. 14 and 15 for analysis of periods or cycles of operation, and to the structural drawings for detail and location of parts and action thereof, a clear description of the operation of the motor will be set forth.

Figure 2:
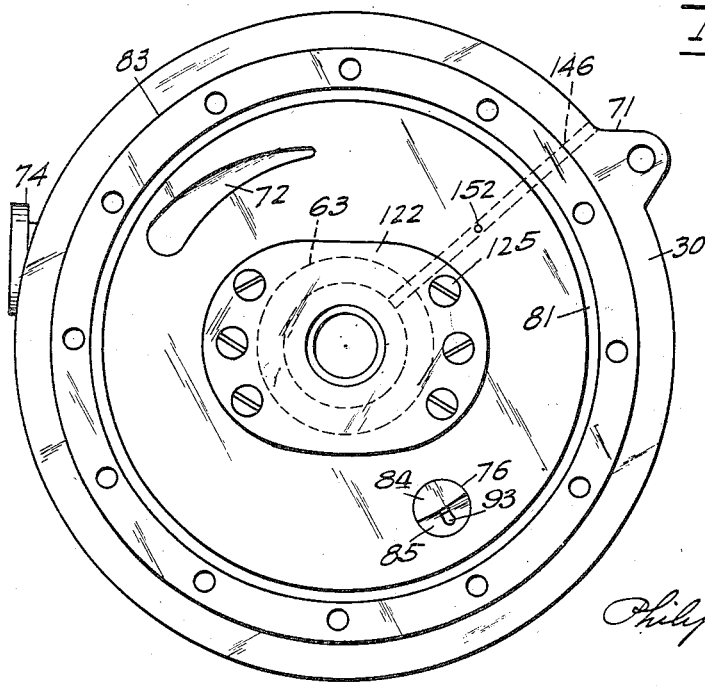
Fig. 2 is an inside view of the front head.

It will be assumed that no gas has been drawn into the cylinders. It is first necessary to charge the cylinders by rotating the shaft 115 by any suitable means such as a crank or suitable electric starter motor (not shown) thus drawing in and compressing a charge ready for firing, as indicated at 156, Figs. 17 and 18, then by turning the plugs 84 to the position shown in Figs. 2 and 10 which is accomplished manually, by moving lever 99 to the position shown in Fig. 1 a bypass is formed as diagrammatically shown in Fig. 18 at 85, or as correctly shown at 85, Fig. 10. Closing the ignition switch 180 fires the charge in one or the other of the adjacent chambers indicated at 156 and 160 in Fig. 18, starting the motor.

Figure 16:
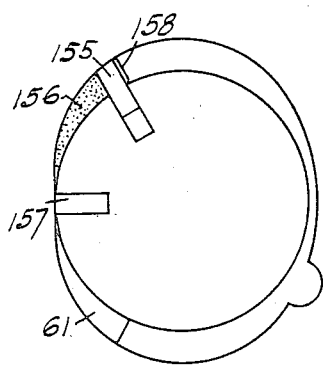
Figure 17:
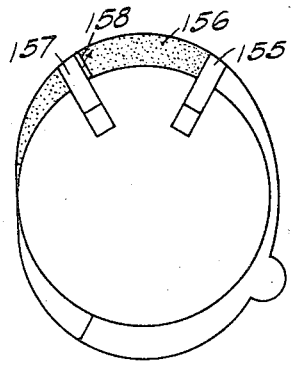

Referring to Fig. 16, with the rotor turning clockwise, vane 155 is drawing a charge of combustible gas 156 through port 79 or 72, moving to the position shown in Fig. 17, the following vane 157 closing the port at 158, the chamber formed by the periphery of the rotor and cylinder walls and the two vanes 155 and 157, Fig. 17 being filled with gas, this being the zone of maximum volume, and corresponds to an intake period of 120 degrees, reference 159, Fig. 14.

The vanes 155 and 157 move to the position shown in Fig. 18, straddling the restrictions 39 at the position indicated and forms the zone of minimum volume or high compression, the gas 156 being at its point of maximum compression, and corresponding to a compression period of 90 degrees, reference 160, Fig. 14.

At this intermediate, maximum compression point vane 155 is just ready to uncover the edge of bypass 85 which is filled with burning gas confined between vanes 155 and 161, and the slightest forward movement of vane 155 will permit the previously ignited expanding charge 160 to ignite charge 156 through bypass 85.

Figure 19:
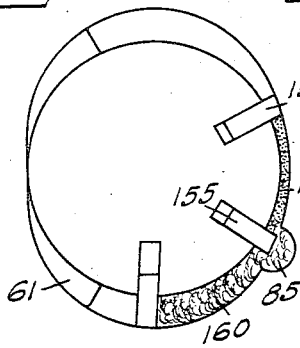
Figure 20:
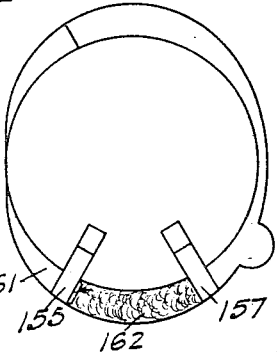

The rotor moves to the position shown in Fig. 19, permitting the combustible gas 156 Fig. 18 to be ignited by communication with the burning gas 160, Figs. 18 and 19, and as the projected area of vane 157 is slightly less than that of vane 155, the motors cannot back fire and thus retrograde movement is obviated, the rotor is driven clockwise by the expansion of the burning gas 162, maximum power being delivered when the vane 157 cooperates with the center or high point of the restriction 39, vane 155 moving to the position shown in Fig. 20 or second zone of maximum volume slightly uncovering the exhaust port, and corresponding to a power period of 90 degrees, reference 164, Fig. 14.

Figure 21:
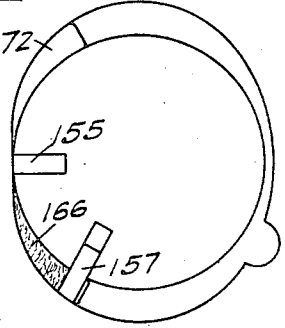

At this point the exhaust port is uncovered at 165 permitting the gases to pass through the ports 61 and 62 in partitions 28 and 29, into the second expansion cylinder, Fig. 11, the vanes 155 moving to the position shown in Fig. 21, corresponding to an exhaust period of 120 degrees, reference 166, Fig. 14.

The exhaust gases pass into the second expansion cylinder 27, during this period, back of blade 167, forcing the rotor to the position of maximum volume when the vane 167 uncovers the edge 168 of ports 57 and 58, corresponding to a power period of 120 degrees, reference 169, Fig. 14.

Fig. 15 is a power diagram indicating that the engine shown in the drawings delivers power to the shaft through an angular distance of four hundred degrees through each revolution for each vane, based on an angular distance of sixty degrees between vanes.

The exhaust gases escaping through port 57 pass about the cylinder walls in both directions, escaping through the exhaust 170, while the gases escaping through port 58 are directed clockwise by the wall 60, any pressure being equalized by the opening 56 through the intermediate wall, this heating jacket coincidently forming a muffler and heating means for the cylinder.

It will be noted that by the overlapping of six vanes on the diagram of Fig. 15, absolutely uniform power is assured, the motor being substantially free from pulsation, noise or fluctuation, and that the engine operates with substantially turbine constancy, that no valves are required, no timed ignition, and that extraneous ignition is only required for starting.

The ignition is shut off by turning the plugs 84 by manually moving lever 102 or 103 on ignition control shaft 101 to the opposite position from that shown in Fig. 1, or moving the shaft counter-clockwise, whereby the opening 85 is closed by the rotor, the solid portion 171 of the plug 84 assuming the position of the bypass shown in Fig. 10 at 85, the rotor then closing the bypass as shown in Fig. 25 and preventing the passage of burning gas to the following charge of combustible gas, stopping the motor.

Manually changing the plugs 84 to firing position, as shown in Fig. 1 and closing the ignition switch immediately starts the engine when the ignition chamber is filled with gas.

In the event of the cylinder walls being too cool to permit ignition by propagation, the ignition switch may be left closed until the engine warms up.

As the specific location of the ignition bypass will not permit pre-ignition, no electric-ignition timing is necessary. The walls soon heat up sufficiently to prevent too sudden quenching of combustion, thus permitting propagation ignition which provides a smoother flow of power, more positive ignition, and increases the efficiency of the engine. The engine cannot operate when the bypass 85 is closed or covered by the rotor as shown in Fig. 25.

Having described an operable method of constructing and using the invention, it will be noted that variations in construction and arrangement of parts which are consistent with the appended claims may be resorted to without detracting from the spirit or scope of the invention or sacrificing any of the advantages thereof.

I claim:

1. In an internal combustion motor having a vane; propagation ignition means for said motor comprising a plug rotatably mounted on an axis coincident with the periphery of the rotor and in a plane parallel to the axis of the rotor, said plug having a recess formed in the end at one side of the axis, said recess being closed by the rotor when the plug is turned to a position with its recess toward the axis of the rotor, and forming a bypass about the edge of a vane when the vane is located thereover with the plug turned in another position with its recess away from the axis of the rotor, and means operable at will for turning said plug to either of its positions.

2. In an internal combustion motor having a vane; propagation ignition means for said motor comprising a plug rotatably mounted on an axis coincident with the periphery of the rotor and in a plane parallel to the axis of the rotor, said plug having a recess formed in the end at one side of the axis, said recess being closed by the rotor when the plug is turned to a position with its recess toward the axis of the rotor, and forming a bypass about the edge of a vane when the vane is located thereover with the plug turned in another position with its recess away from the axis of the rotor, and means operable at will for turning said plug to either of its positions, and auxiliary electrical ignition means consisting of an electrode insulated from and extending axially through said plug, the ignition point of said electrode terminating in spaced relation to the side wall formed by the recess adjacent the axial center of the plug.

3. In an internal combustion motor having a vane; propagation ignition means for said motor comprising a plug rotatably mounted on an axis coincident with the periphery of the rotor and in a plane parallel to the axis of the rotor, said plug having a recess formed in the end at one side of the axis, said recess being closed by the rotor when the plug is turned to a position with its recess toward the axis of the rotor, and forming a bypass about the edge of a vane when the vane is located thereover with the plug turned in another position with its recess away from the axis of the rotor, and means operable at will for turning said plug to either of its positions, and auxiliary electrical ignition means consisting of an electrode insulated from and extending axially through said plug, the ignition point of said electrode terminating in spaced relation to the side wall formed by the recess adjacent the axial center of the plug, and a source of high tension low frequency current for said electrode.

4. In an internal combustion motor having a vane; propagation ignition means for said motor comprising a plug rotatably mounted on an axis coincident with the periphery of the rotor and in a plane parallel to the axis of the rotor, said plug having a recess formed in the end at one side of the axis, said recess being closed by the rotor when the plug is turned to a position with its recess toward the axis of the rotor, and forming a bypass about the edge of a vane when the vane is located thereover with the plug turned in another position with its recess away from the axis of the rotor, and means operable at will for turning said plug to either of its positions, and auxiliary electrical ignition means consisting of an electrode insulated from and extending axially through said plug, the ignition point of said electrode terminating in spaced relation to the side wall formed by the recess adjacent the axial center of the plug, and a source of high tension low frequency current for said electrode, said source of high tension current consisting of a source of electrical energy and, a buzzer or interrupter and the secondary of a step-up transformer having its terminals connected respectively to the plug and to the electrode, whereby a continuous stream of sparks is produced, and, means for breaking the circuit at will.

5. A rotary internal combustion motor, in combination, a rotor having a plurality of radially acting vanes, a compression chamber, a combustion chamber, and an ignition chamber restrictedly communicating between said compression chamber and said combustion chamber, a circular recess of greater arcuate diameter than the thickness of said vanes formed in the chamber wall with the ignition-chamber side of the recess substantially coincident with the ignition-chamber side of the leading vane of two vanes centrally straddling the ignition chamber, whereby movement of the vanes in the normal direction of movement will bypass burning gases from the combustion chamber to the ignition chamber, and retrograde propulsion of the rotor is obviated; said recess being formed with its axis substantially coincident with the peripheral edge of the rotor whereby one-half of the recess is continuously covered by the rotor, and, a plug rotatably mounted in the recess and having one side extending to the inner surface of the chamber wall and the other side recessed, means operable at will for turning said plug whereby when the plug is turned in one position, the extending portion of the plug closes the other half of the recess for interrupting the operation of the motor, and when turned in its other position, it provides a semicircular recess for the purpose previously described.

6. A rotary internal combustion motor comprising, a rotor having a plurality of radially acting vanes, a compression chamber, a combustion chamber, and an ignition chamber restrictedly communicating between said compression chamber and said combustion chamber, a circular recess of greater diameter than the thickness of said vanes formed in the chamber wall with the ignition-chamber side of the recess substantially coincident with the ignition-chamber side of the leading vane of two vanes centrally straddling the ignition chamber, whereby movement of the vanes in the normal direction of movement will bypass burning gases from the combustion chamber to the ignition chamber, and retrograde propulsion of the rotor is obviated by the greater projected area of the leading vane as related to the following vane at the time of ignition; said recess being formed with its axis substantially coincident with the peripheral edge of the rotor whereby one-half of the recess is continuously covered by the rotor, and, a plug rotatably mounted in the recess and having its inner end at one side extending to the inner surface of the chamber wall and its other side recessed, whereby, when the plug is turned in one position, the extending portion of the plug closes the other half of the recess for interrupting the operation of the motor, and when turned to its other position, it forms a semi-circular recess for the purpose previously described, and electrical ignition means located in the semi-circular recess for initial starting of the motor, and a source of current for said electrical ignition means, said electrical ignition means being timed by the movement of the vanes across the recess.

7. In combination with a motor having a rotor provided with vanes, a cylinder having a wall and a bore formed through the wall with its axis coincident with the periphery of the rotor, a plug rotatable in said bore and recessed on one side forming a bypass for burning gases about a vane when the vane is centered thereover with the plug in one position, said bypass being closed by the rotor when the plug is in another position, and manually controlled means for rotating said plug to either of its positions.

8. In combination with a motor having a rotor provided with vanes, a cylinder having a wall and a bore formed through the wall with its axis coincident with the periphery of the rotor, a plug rotatable in said bore and recessed on one side forming a bypass for burning gases about a vane when the vane is centered thereover with the plug in one position, said bypass being closed by the rotor when the plug is in another position, and manually controlled means for rotating said plug to either of its positions, said bore having its leading edge substantially coincident with the compression side of a leading vane when the vane is in its highest compression position in conjunction with a following vane, whereby ignition of a compressed charge between the leading vane and the following vane is accomplished only when the projected area of the leading vane is greater than that of the following vane, whereby retrograde propulsion of the rotor is obviated.

9. In combination with a motor having a rotor provided with vanes, a cylinder having a wall and a bore formed through the wall with its axis coincident with the periphery of the rotor, a plug rotatable in said bore and recessed on one side forming a bypass for burning gases about a vane when the vane is centered thereover with the plug in one position, said bypass being closed by the rotor when the plug is in another position, manually controlled means for rotating said plug to either of its positions, and electrical ignition means located in said plug and operable within said recess for auxiliary starting ignition for said motor.

10. In combination with a rotor having vanes and a housing having a high compression zone; means adjustably mounted in said housing in cooperative relation to the rotor and to the vanes, forming, when in one adjusted position, a bypass for burning gases about a leading vane when the vane is in a predetermined position, and, when the means is in another adjusted position, sealing off the bypass in cooperation with the rotor.

11. In combination with an internal combustion motor having a rotor and a plurality of vanes; propagation ignition means comprising an adjustable member cooperatively related to the rotor and to the vanes and having a recess formed therein forming a bypass for gases, said bypass being controlled by said vanes when the member is in one adjusted position for operation of the motor, and being sealed against bypassing gases by the rotor when the member is in another adjusted position for interrupting the operation of said motor, and manually controlled means for adjusting said member.

12. In combination with a rotor having vanes and a housing having a high compression zone; means adjustably mounted in said housing in cooperative relation to the rotor and to the vanes, forming, when in one adjusted position, a bypass for burning gases about a leading vane when the vane is in a predetermined position, and, when the means is in another adjusted position, sealing off the bypass in cooperation with the rotor, said leading vane sealing the bypass from the high compression zone when the leading vane and a following vane form the zone of high compression, whereby ignition of a compressed charge of gas can only occur when the reaction on the following vane has a value lower than the action on the leading vane, thereby preventing retrograde propulsion of the rotor.

13. In combination with a motor having a housing and a rotor provided with a leading vane and a following vane forming when in one position in combination with a predetermined portion of the housing a high compression zone; ignition means adjustably mounted in said housing in cooperative relation to the rotor and to the vanes, forming when in one adjusted position, a bypass for burning gases about the leading vane when the vanes are in an advanced position as related to the high compression zone, said bypass being sealed by the rotor when the ignition means is adjusted to its other position, and being sealed against the high compression zone by the leading vane when the leading vane is in its high compression zone forming position, and manually controlled means for adjusting said ignition means to either of its positions.

14. A rotary internal combustion motor comprising a rotor having a plurality of equi-angularly spaced vanes, a housing having a chamber formed at each end between the end portions of the peripheral wall thereof and the periphery of the rotor, a restricted gas passage formed between one side portion of the wall and the periphery of the rotor and communicating between the chambers, a high compression chamber formed by two adjacent vanes when the vanes are centrally straddling the restricted gas passage, an ignition member having a recess of an arcuate length greater than the thickness of a vane and located entirely outside the high compression chamber and between the peripheral wall and the periphery of the rotor, said member being movable to a position where the recess is covered by the rotor for interrupting the operation of the motor, and manually controlled means for moving the member at will.

15. Propagation ignition means for an internal combustion motor having a rotor and a plurality of vanes; comprising an ignition stud rotatably mounted with its axis coincident with the periphery of the rotor and having a diameter greater than the thickness of a vane and having one half of its end portion cut back to form a bypass for gases about a vane, means for rotating said stud to either of two positions, said bypass being sealed by the rotor when the stud is in one position and being vane-controlled when in its other position for timing the ignition.

16. In combination with a rotary internal combustion motor having a rotor provided with a plurality of equi-angularly spaced vanes; a rotor compartment having a peripheral wall and end walls, said peripheral wall being of substantially elliptical form and cooperating on one side with the periphery of the rotor, and slightly clearing the rotor on the other side of its minor axis to coincidently form a high compression zone and restricted passage for gases, an ignition plug rotatably mounted in one end wall with its axis coincident with the periphery of the rotor and the leading edge of the periphery located an angular distance from the center of the high compression zone slightly in excess of one-half the angular distance between two vanes in the normal direction of rotation of the rotor, said plug having a diameter greater than the thickness of a vane and having a half-portion cut away to form a recess for passage of gases, and means operable at will for rotating said plug to either of two positions, in one of which the recess is closed by the rotor, and in the other of which the recess will bypass burning gases to ignite a following charge of combustible gas.

17. In a rotary internal combustion motor having a rotor, vanes and a housing; a high compression chamber formed between the wall of the housing, the periphery of the rotor and two adjacent vanes when in predetermined position, and ignition means consisting of a gas passage having a width greater than the thickness of a vane and located outside the confines of the high compression chamber, and means operable at will for sealing off said gas passage to interrupt the operation of said motor.

18. In a rotary internal combustion motor having a rotor, vanes and a housing; a high compression chamber formed between the wall of the housing, the periphery of the rotor and two adjacent vanes when in predetermined position, and ignition means consisting of a gas passage having a width greater than the thickness of a vane and located outside the confines of the high compression chamber, and means operable at will for sealing off said gas passage to interrupt the operation of said motor, and auxiliary electrical ignition means located in said gas passage for starting the motor.

19. Propagation ignition means for a motor having a rotor comprising a member adjustable to two positions and having a recess formed therein for bypassing gases from a combustion chamber to an ignition chamber, said recess being located beyond the periphery of the rotor when the member is in one adjusted position, and being located within the periphery of the rotor and closed by the rotor when the member is in its other adjusted position for interrupting the operation of the motor, and means for adjusting the member at will.

20. In combination with a rotary internal combustion motor having a rotor provided with a plurality of equi-angularly spaced vanes and mounted in a substantially elliptical compartment having a minor axis of greater diameter than the diameter of the rotor with the rotor eccentrically located on the minor axis and thereby coincidently forming a restricted gas passage and high compression zone on one side of the rotor and forming a gas seal on the other side of the rotor; ignition means for said motor comprising a bypass located an angular distance from the center of the high compression zone slightly in excess of one-half the angular distance between two vanes in the direction of rotation of the rotor for bypassing previously ignited gases to compressed gases in the high compression zone, and manually controlled means operably related to the rotor for sealing off said bypass against bypassing gases when the operation of the motor is to be interrupted.

PHILIP A. FRIEDELL.